(12) United States Patent
Pritchard et al.

(10) Patent No.: US 8,078,445 B2
(45) Date of Patent: Dec. 13, 2011

(54) LOAD CHARACTERIZATION IN SERVO DRIVE SYSTEMS

(75) Inventors: John Pritchard, Cedarburg, WI (US); Graham F. Elvis, Staffs (GB); Gurdial Singh, New York, NY (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 543 days.

(21) Appl. No.: 12/242,367

(22) Filed: Sep. 30, 2008

(65) Prior Publication Data

US 2010/0082310 A1    Apr. 1, 2010

(51) Int. Cl.
*G06F 17/50* (2006.01)

(52) U.S. Cl. ............. 703/13; 703/22; 700/213; 700/255

(58) Field of Classification Search .................. 703/2, 5, 703/6, 13; 700/245, 255, 213; 701/23, 25, 701/26–30; 345/474
See application file for complete search history.

(56) References Cited

U.S. PATENT DOCUMENTS

| | | | |
|---|---|---|---|
| 4,347,578 A | 8/1982 | Inaba | |
| 5,083,072 A | 1/1992 | Song | |
| D366,867 S | 2/1996 | Kurokawa | |
| 5,532,566 A | 7/1996 | Burke | |
| 5,739,653 A | 4/1998 | Coy | |
| 5,754,433 A | 5/1998 | Fukui | |
| 6,493,607 B1 * | 12/2002 | Bourne et al. | 700/255 |
| 6,658,370 B2 | 12/2003 | Christ | |
| 6,917,850 B2 | 7/2005 | Kamishio | |
| 6,941,189 B2 | 9/2005 | Linn | |
| 6,943,976 B2 * | 9/2005 | Goodman et al. | 360/69 |
| 7,129,951 B2 * | 10/2006 | Stelly, III | 345/474 |
| 2007/0005179 A1 * | 1/2007 | Mccrackin et al. | 700/213 |

FOREIGN PATENT DOCUMENTS

EP    19860900266    1/1987

* cited by examiner

*Primary Examiner* — Thai Phan
(74) *Attorney, Agent, or Firm* — Turocy & Watson, LLP; Alexander R. Kuszewski; John M. Miller

(57) ABSTRACT

Systems and methods that characterizes a load as a function of position/movement of mechanical components—as induced by such load in the servo-drive system. By running a plurality of motion profiles, corresponding torque/forces that generate such motions can be calculated and readily represented (e.g., as a table) in form of a position dependent load. In addition, a parsing component can decompose or break up a load (which generates a desired motion) to its subparts or constituent values for further simulation analysis.

20 Claims, 9 Drawing Sheets

| Motion Analyzer | | | | | |
|---|---|---|---|---|---|
| Position (rev) | Inertia (kg-m²) | Static Torque (N.m) | Description | Start Position | Inertia Sub-component |
| 0 | 0.002833 | 0 | | | |
| 0.0027799 | 0.002804 | -0.62063 | | | |
| 0.005999 | 0.002384 | -1.03332 | | | |
| 0.00833 | 0.002422 | -1.66641 | | | |

LOAD CHARACTERIZATION IN SERVO DRIVE SYSTEMS

TECHNICAL FIELD

The subject invention relates generally to industrial control systems, and more particularly to characterizing mechanical loads as a function of motion/position of the mechanical system.

BACKGROUND

Motion controllers are special-purpose computers utilized for controlling motors, drives, and other aspects of a mechatronic system. In general, designing a system with drive technology, or mechatronic chains (e.g., combination of software/mechanical/control systems), can become a challenging task due to various dynamic parameters that continuously change in motion systems associated therewith. Additional difficulties relate to unknown or poorly defined parameters such as compliance and/or backlash between the load; the motor impact interaction; expected performance and the like. Moreover, additional complexities arise from the inherent complicated relationship between load, mechanism, servo motor, feedback, servo drive, controller and gain settings Typically, determining answers to such questions often requires building a prototype machine and conducting empirical tests to collect data, and determine the proper combinations of machinery and configuration parameters. Another limited solution involves employing general simulation software such as computer aided design (CAD) systems, when intended design fits within constraints of such simulation software systems. Even so, simulation tasks can prove to be a slow process burdened with various inefficiencies. For example, the CAD dynamics simulation typically employs a non-fixed time base model, whereas the simulation of a servo system is discrete (e.g. every 1 ms). Such can introduce further complexities when combining the makes it challenging to combine the two.

In general, to simulate such servo mechanical systems a substantially simultaneous operation is required for a computer aided design CAD system and an analysis engine, such as proprietary industrial software. For example, while the CAD system is running data is being inputted thereto, and subsequently results are sent to the analysis engine for analyzing the motions involved. The cycles of data exchange between the CAD system and the analysis repeat until desired simulation is obtained. Nonetheless, such incremental exchange of data between the CAD system and analysis system is cumbersome and fails to provide a rapid progression for various simulation scenarios of the system.

SUMMARY

The following presents a simplified summary in order to provide a basic understanding of some aspects described herein. This summary is neither an extensive overview nor is intended to identify key/critical elements or to delineate the scope of the various aspects described herein. Its sole purpose is to present some concepts in a simplified form as a prelude to the more detailed description presented later.

The subject innovation characterizes a load as a function of position/movement of mechanical components—as induced by such load in the servo-drive system. As such, by running a plurality of motion profiles, corresponding torque/forces that generate such motions can be identified and represented for further analysis of the servo-motor system. In one aspect, for a given motor position, the load that creates such motor position can be summarized and described in form of a table or any readily discernable representation. Hence, such table/representation depicts the load as a function of motion (e.g., position dependent load), which the load induces in the mechanical units or members (e.g., rods, hinges) of the servo-motor system. The table/representation can designate combination of loading and facilitate simulation by reducing a risk of design change; reducing design time to ship time; increasing reliability and optimize system selection/increase machine performance. By employing position dependent load (e.g., in form of a table), the simulation system can be decoupled from the CAD system when providing further simulation based on the position dependent load. Moreover, simulation based on such position dependent load (e.g., table representation) can mitigate synchronization problems between non-fixed time base models of the CAD system, and simulation of servo systems that employ discrete time periods (e.g., 1 ms).

According to a further aspect, a parsing component can decompose or break up a load (which generates a desired motion) to its subparts or constituent values. Such decomposition can be based on predetermined criteria as set by a user. Such can include criteria based on environmental factor (e.g., effects of the environment that the system operates therein such as gravity corresponding gravity forces), linkage factors (e.g., connection/friction coefficients that link various members of the servo-motor system together) and member factors (e.g., mass/dimensions of a member that designate inertia of such member.) In one aspect, a torque vector can be decomposed to subpart portions based on inertia, friction, and gravity. For example, a user can require the parsing component to break up such torque based on a gravity forces subpart, an inertia subpart, and a friction subpart as pre-determined by the user. As such, a determination can be made to identify contributions from friction, gravity, and inertia to move the system based on the designated motion profile. Hence the CAD system can be decoupled from the simulation system when increasing/decreasing contributions from each subpart.

In a related methodology, initially static configuration or geometry for mechanical components of the servo-drive system can be defined as part of a CAD system. Subsequently, desired dynamics or motion of such mechanical components can be designated via motion profiles for the CAD system (e.g., designating an angular rotation for a member via APIs.) By interrogating such CAD system, an analysis engine can then generate a representation (e.g., in form of a table), which describes a position of the system that is dependent on the load (e.g., a position dependent load). For example, by initially defining angular motion profiles for the servo motor drive, then the type of torques, moments and force that are required to produce such motion can be determined. Such torque/moment/forces can be tabulated to represent a model for position dependent load. Moreover, the torques/moments/forces can further be decomposed to constituents (e.g., decomposition of vectors) based on predetermined criteria (e.g., gravity, friction, inertia).

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
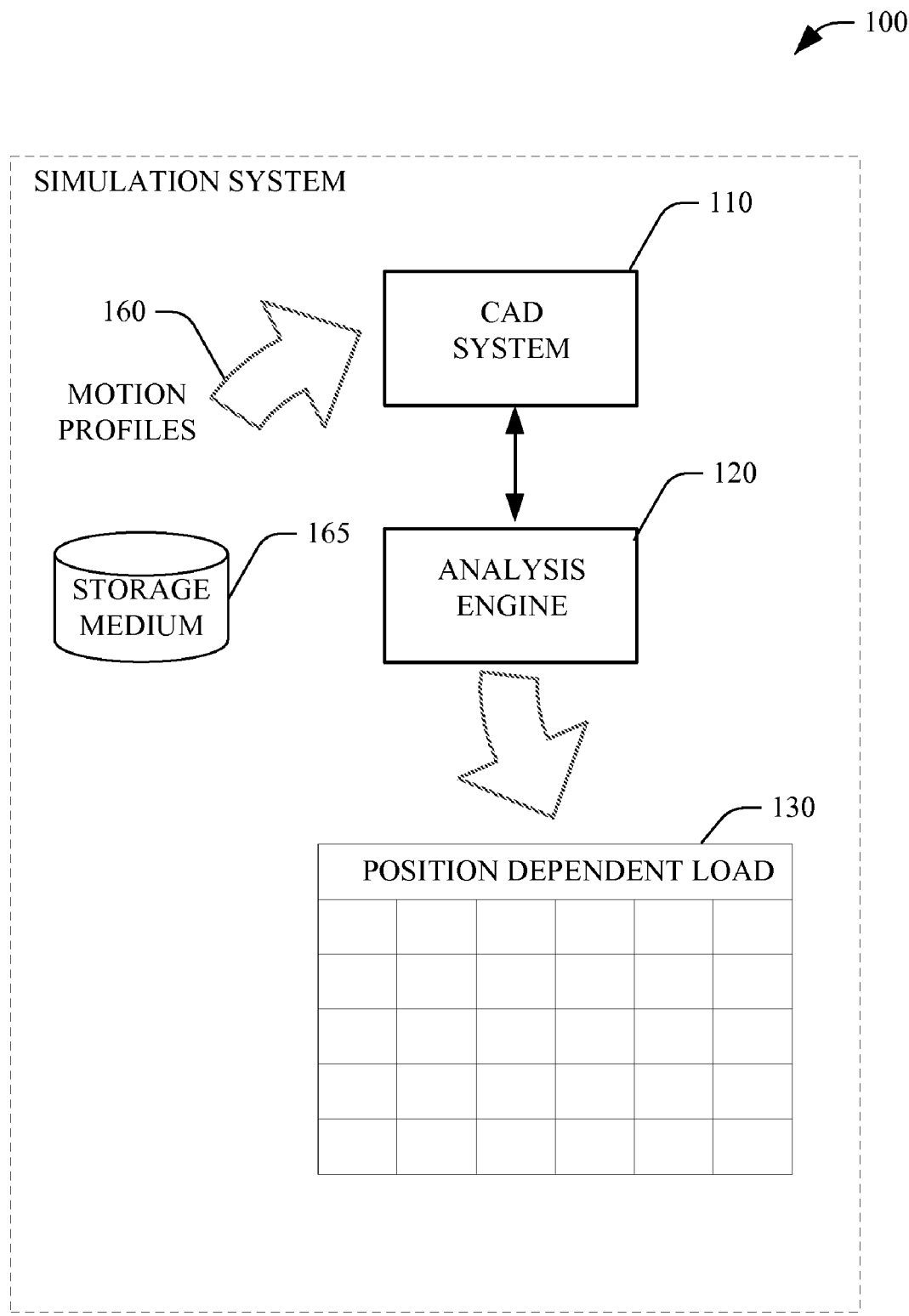
FIG. 1 illustrates a block diagram for a system that implements a position dependent load in form of a table according to a further aspect.

FIG. 1 illustrates a simulation system 100 that can characterize a load as a function of motion profiles 160 (e.g., position/movement designations) that such load induces in the servo-drive system in accordance with an aspect of the subject innovation. The simulation system 100 enables performance of substantially rapid simulations, wherein upon generation of the position dependent load 130, a requirement for continuously interacting with the CAD system 110 can be mitigated, wherein simulations can occur by decoupling the CAD system 110 from the system 100, for example. Put differently, the position dependent load 130 can represent a one-to-one correspondence between motion profiles of mechanical member (e.g., rods, hinges), and torques/moments/forces that are required to be induced on such system to create the pre designated movement/motion profiles 160 (and vice versa). By generating the position dependent load 130 (e.g., as a table), simulation can be performed independent of a continuous interaction with the CAD system 110. In one aspect, generation of the position dependent load 130 occurs through the analysis engine 120, wherein by analyzing static/dynamic characteristics of the system, the forces/moments/torques required to induce the motion profiles 160 are calculated. Hence, the analysis engine 120 provides the user the ability to analyze the motion profiles and generate corresponding loading conditions. For example, the analysis engine 120 can analyze system information related to motor parameters, such as but not limited to inertia ratio, peak torque, temperature rise, angular/linear velocities specified for different mechanical units that form the servo electric device, and the like. In another example, the information includes drive parameters such as but not limited to average amperes, peak amperes and bus volts.

The motion profiles 160 can be extracted from a storage medium 165 that can includes a preconfigured database for generation of the simulation. Such storage medium 165 can further include data acquired from various industrial controllers and other user defined databases. For example, the data storage medium 165 can be a complex model based database structure, wherein an item, a sub-item, a property, and a relationship can be defined to allow representation of information within a data storage system as instances of types. Moreover, the data storage medium 165 can employ a set of basic building blocks for creating and managing rich, persisted objects and links between objects, wherein such objects can represent motion profiles associated with the servo-electrical system. In addition, an item can be defined as the smallest unit of consistency within the data storage medium 165, which can be independently secured, serialized, synchronized, copied, backup/restored, and the like.

Furthermore, the data storage medium 165 can be based upon at least one item and/or a container structure, and can act as a storage platform exposing rich metadata that is buried in files as items. Such data storage medium 165 can include the database (not shown), to support the above discussed functionality, wherein any suitable characteristics and/or attributes can be implemented. Moreover, the data storage medium 165 can employ a container hierarchical structure, wherein a container is an item that can contain at least one other item. Such containment concept can be implemented via a container ID property inside the associated class related to a motion profiles such as angular velocities, linear velocities, accelerations, and the like. For example, a preconfigured database can represent accumulation of servo driven system knowledge collected from empirical system operation and control system databases Accordingly, by running a plurality of motion profiles 160 obtained from the storage medium 165, corresponding torque/forces that generate such motions can be identified and represented for further analysis of the servo-motor system. As illustrated, for a given motor position or motion profile 160, the load that creates such motor position can be summarized and described in form of the table 130 or any readily discernable representation. Hence, such table/representation depicts the load as a function of motion (e.g., position dependent load), which the load induces in the mechanical units or members (e.g., rods, hinges) of the servo-motor system. The table/representation 130 can designate combination of loading and facilitate simulation by reducing a risk of design change; reducing design time to ship time; increasing reliability and optimize system selection/increase machine performance. By employing the position dependent load 130 (e.g., in form of a table), the simulation system can be decoupled from the CAD system when providing further simulation based on the position dependent load.

Figure 2:
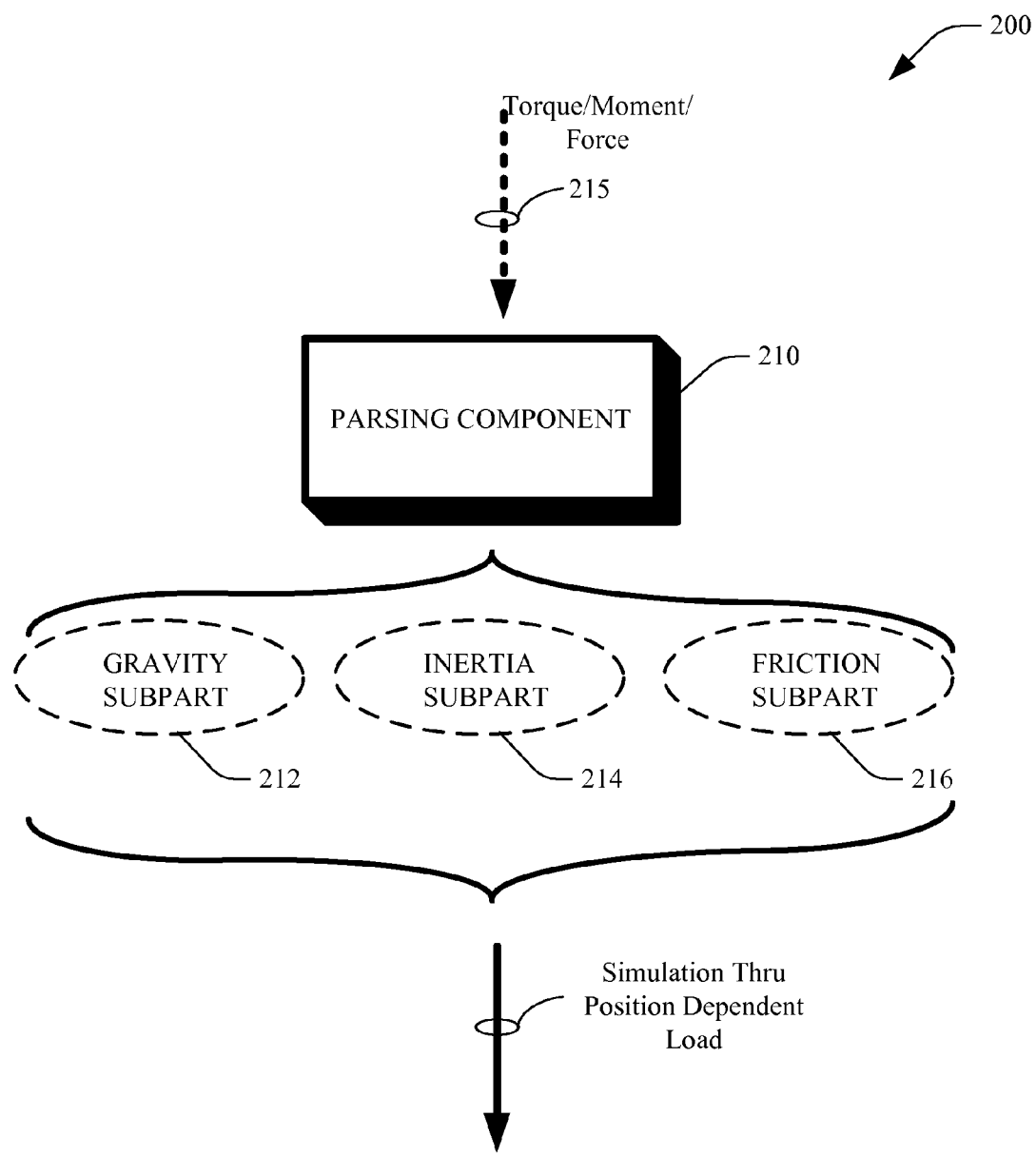
FIG. 2 illustrates an exemplary parsing component, which can decompose or break up a load that generates a desired motion to its subcomponents as predetermined by a user.

FIG. 2 illustrates an exemplary system 200 that has a parsing component 210, which can decompose or break up a load that generates a desired motion to its subcomponents as predetermined by user criteria. As illustrated in FIG. 2, the torque/moment/force 215 required to cause the motion profiles on the servo drive are inputted into the parsing component 215. As illustrated in FIG. 2, the parsing component 210 can decompose or break up a load 210 (as designated by the analysis engine to generate a desired motion) to its subparts or constituent values 212, 214, 216. The decomposition can be based on predetermined criteria as set by a user. For example, such can include criteria based on environmental factor (e.g., effects of the environment that the system operates therein such as gravity corresponding gravity forces), linkage factors (e.g., connection/friction coefficients that link various members of the servo-motor system together) and member factors (e.g., mass/dimensions of a member that designate inertia of such member.) For example, a torque vector can be decomposed to subpart portions based on inertia, friction, and gravity. Accordingly, a user can require the parsing component 210 to break up such torque based on a gravity forces subpart, an inertia subpart, and a friction subpart as pre-determined by the user. Hence, a determination can be made to identify contributions from friction, gravity, and inertia to move the system based on the designated motion profile. Such contributions from subparts can further appear as additional columns or rows in the table representation of the position dependent load. As explained earlier, the position dependent load enables decoupling of the CAD system from the simulation system, and allows substantially rapid simulations when increasing/decreasing contributions from each subpart.

Figure 3:
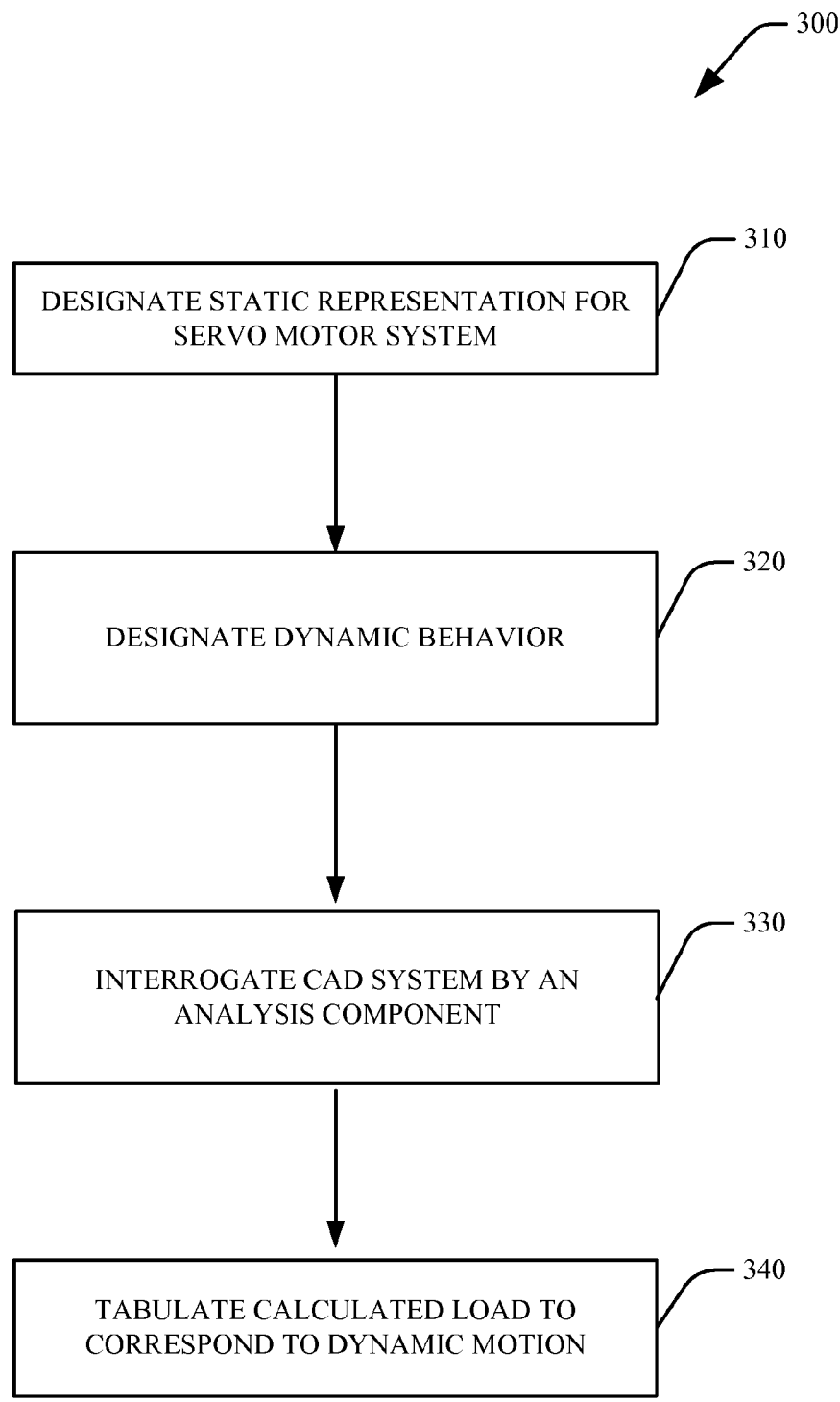
FIG. 3 illustrates a methodology of characterizing a load as a function of position/movement of mechanical components according to a further aspect.

FIG. 3 illustrates a methodology 300 of characterizing a load as a function of position/movement of mechanical components according to a further aspect of the subject innovation. While the exemplary method is illustrated and described herein as a series of blocks representative of various events and/or acts, the present invention is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, may be required to implement a methodology in accordance with the present invention. Moreover, it will be appreciated that the exemplary method and other methods according to the invention may be implemented in association with the method illustrated and described herein, as well as in association with other systems and apparatus not illustrated or described. Initially and at 310 selections that specify dimensions and the static representation of a servo motor system can be designated. Such can include geometry (e.g., dimensions, angles between members) and physical properties (e.g., mass) of the various components or building blocks of the servo motor system. Next and at 320, a motion profile and dynamic behavior for the servo driven mechatronic system is further designated by the user. Such can include designation for angular velocity, linear velocity, acceleration, and over all defining dynamic parameters associated with a servo driven system. Such designation for the dynamic behavior of the servo system can further be based on prior empirical data, which is collected and stored for such systems. A user can be presented graphic screens for entering selections including but not limited to type of motion for different segments and/or members of the servo motor system. In addition, other exemplary aspects enable the user to provide additional parameters that can indirectly affect dynamic behavior of the servo motor system (e.g., maximum/minimum operating temperature or pressure, and the like). As such, the dynamics of the system can be identified for the CAD system, which further supplies associated graphical representation.

By interrogating such CAD system at 330, an analysis engine can then calculate a loading arrangement required to obtain the dynamic motion specified for the system during act 320. For example, the magnitude and direction of torques, moments and forces that are required to produce the designated dynamic properties in act 320 can be calculated. At 340, such calculated load arrangement can subsequently be tabulated to correspond to dynamic motion of the system. The table/representation can designate combination of loading and facilitate simulation by reducing a risk of design change; reducing design time to ship time; increasing reliability and optimize system selection/increase machine performance.

Figure 4:
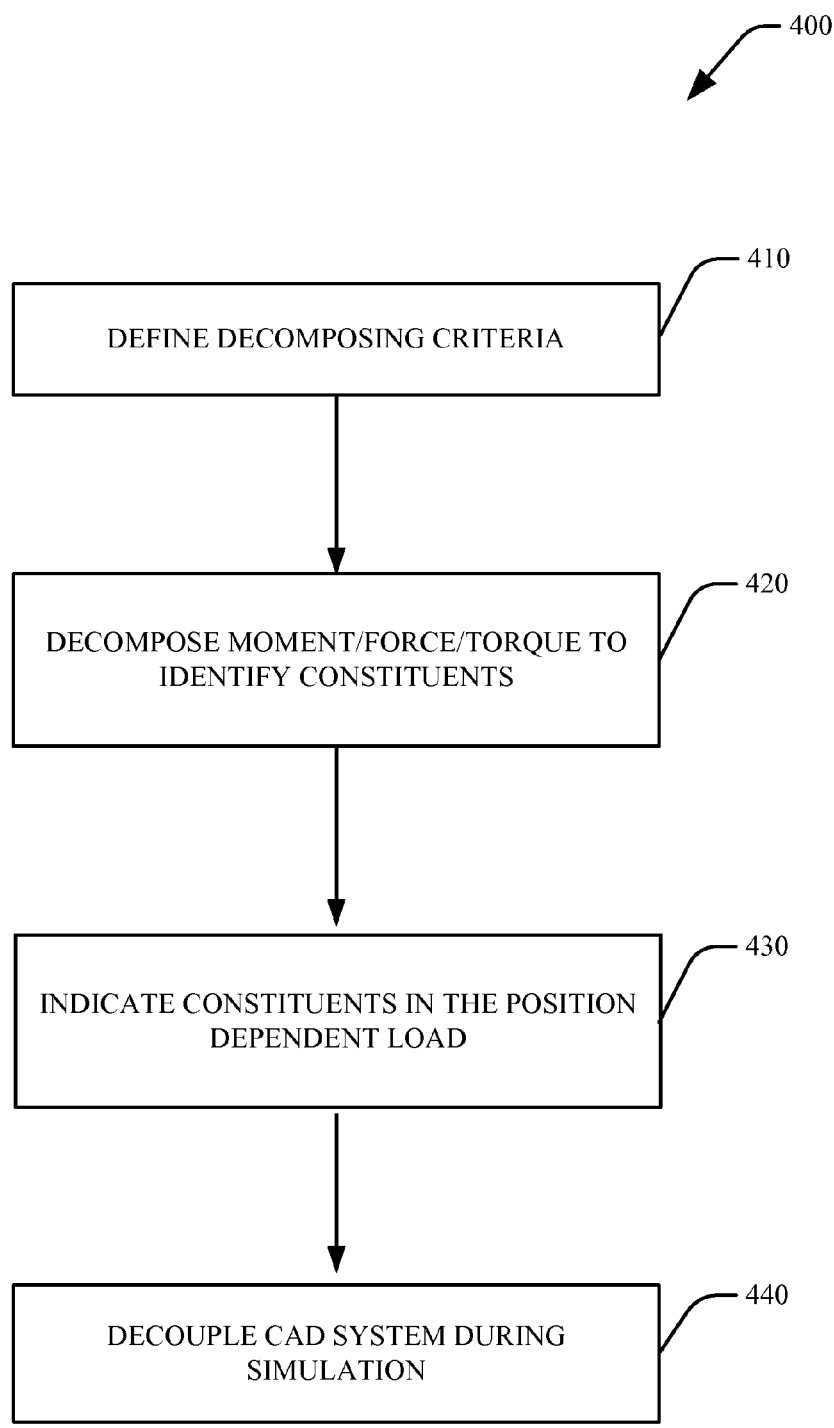
FIG. 4 illustrates a further methodology of implementing a position dependent load according to a further aspect.

FIG. 4 illustrates a related methodology 400 that can also be implemented in conjunction with the methodology 300 of the subject innovation. Initially, and at 410 decomposing criteria can be defined by a user for breaking up the calculated force/moment/torque as calculated by the analysis component of the subject innovation. Such can include defining criteria based on environmental factor (e.g., effects of the environment that the system operates therein, such as gravity/corresponding gravity forces), linkage factors (e.g., connection/friction coefficients that link various members of the servo-motor system together) and member factors (e.g., mass/dimensions of a member that designate inertia of such member.) Next, and at 420 each of the moment/force/torque can be broken up based on such criteria, to identify contributions from each of the constituents. For example, a user can break up of a torque based on criteria such as gravity subpart, an inertia subpart, and a friction subpart. Accordingly, a determination can be made to identify associated contributions from each of the constituents—which move the system based on the earlier specified dynamics and motion profile. At 430, result of such decomposition can be added as columns or rows to the position dependent load. Subsequently, further simulation can be performed by employing position dependent load (e.g., in form of a table), wherein the simulation system can be decoupled from the CAD system.

Figures 5, 6:
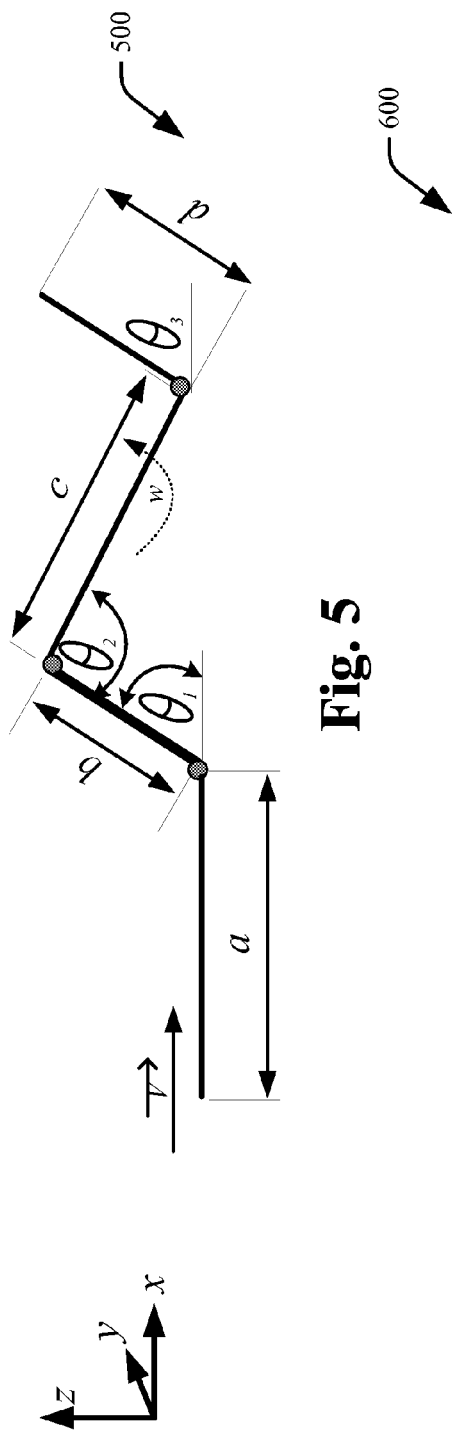
FIG. 5 illustrates an exemplary linkage structure that can implement various aspects of the subject innovation.
FIG. 6 illustrates a particular position dependent load according to a further aspect.

FIG. 5 illustrates an exemplary linkage structure 500 that can implement a simulation in accordance aspect with an aspect of the subject innovation. Initially, the geometry, such as the dimensions, a, b, c, d as well related associated angles $\theta_1$, $\theta_2$, $\theta_3$, $\theta_4$ and physical properties (e.g., mass) of the various components or building blocks of the servo motor system 500 can be designated. Likewise, motion profiles for the various components, such as linear velocity v and the angular velocity w for the various members of the servo motor system 500 can be defined. Required forces/moments/torques that cerate such motion can then be calculated and subsequently designated in from of a tabular arrangement 600 of FIG. 6—hence representing a position dependent load.

Figure 7:
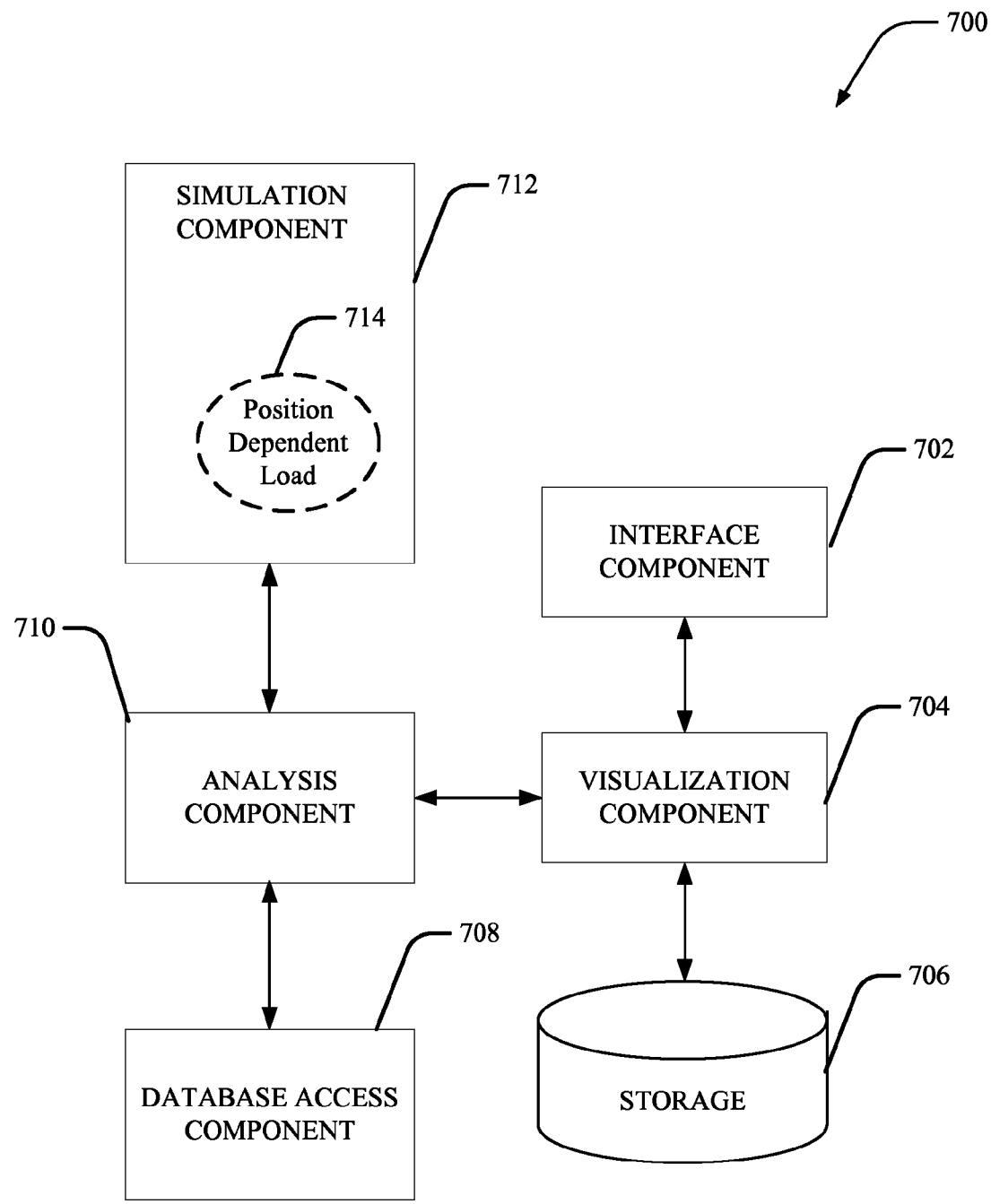
FIG. 7 illustrates an exemplary simulation system with a position dependent load according to a particular aspect of the subject innovation.

FIG. 7 illustrates a further aspect of a servo driven mechatronic visualization system 700 for analyzing members and simulating the operation via the position dependent load of the subject innovation. The system provides a mechanism to design and test a servo driven mechatronic system while being decoupled from a CAD system and/or without the costly expense of prototyping the system or the lengthy lead time to configure a generalized simulation software package, and hence investigate whether the selected components are operationally acceptable and compatible. The visualization component 704 can be employed to facilitate creating a servo driven mechatronic system related to automation control systems, devices, and/or associated equipment that form part of a production environment. Servo driven mechatronic system 700 includes interface component 702, visualization component 704, storage component 706, database access component 708, analysis component 710 and simulation component 712 that employs the position dependent load 714, as described in detail supra.

The interface component 702 can be communicatively connected to Input/Output devices (not shown). The interface component 702 provides for object or information selection, input can correspond to entry or modification of data. Such input can affect the configuration, graphic display, reports and/or automation devices. For instance, a user can select a motion configuration or application from list of previously created applications or can instruct the servo driven mechatronic visualization system 700 to create a new application.

The interface component 702 receives input regarding the static or dynamic configuration for the servo driven mechatronic. Various identification mechanisms can be employed. For example, user input can be based on positioning and/or clicking of a mouse, stylus, or trackball, and/or depression of keys on a keyboard or keypad with respect to displayed information. Furthermore, a related display device can operate via a touch screen device such that identification can be made based on touching a graphical object. The visualization component 704 presents the configuration screens to the user for selecting the components of the servo driven mechatronic system. One or more of the configuration displays can further contain data entry fields, buttons, check boxes or dropdown menus for selecting components and their associated configuration parameters. For example, the display graphic can have a section identifying criteria for parsing, as explained in detail above. In another example, the user can configure the load data by entering the mass, the external force and the coefficient of friction related to the load and table mass. Additionally, the user can select an inclination depicting the path of travel of the load.

As explained earlier, the storage component 706 can provide the ability to archive preconfigured process motion application solutions, preconfigured servo driven mechatronic visualization systems including displays, reports and graphs and user configured components for the system 700. Moreover, servo driven mechatronic application data can be maintained on the storage component 706 for future review with regards to creating new preconfigured servo driven mechatronic systems or updating existing ones.

As explained earlier, generation of the position dependent load 714 occurs through the analysis component 710, wherein by analyzing static/dynamic characteristics of the system, the forces/moments/torques required to induce the motion profiles are calculated. Hence, the analysis component 710 provides the user the ability to analyze the motion profiles and generate corresponding loading conditions. For example, the analysis component 710 can analyze system information related to motor parameters such as but not limited to inertia ratio, peak torque, temperature rise, angular/linear velocities specified for different mechanical units that form the servo electric device, and the like.

Figure 8:
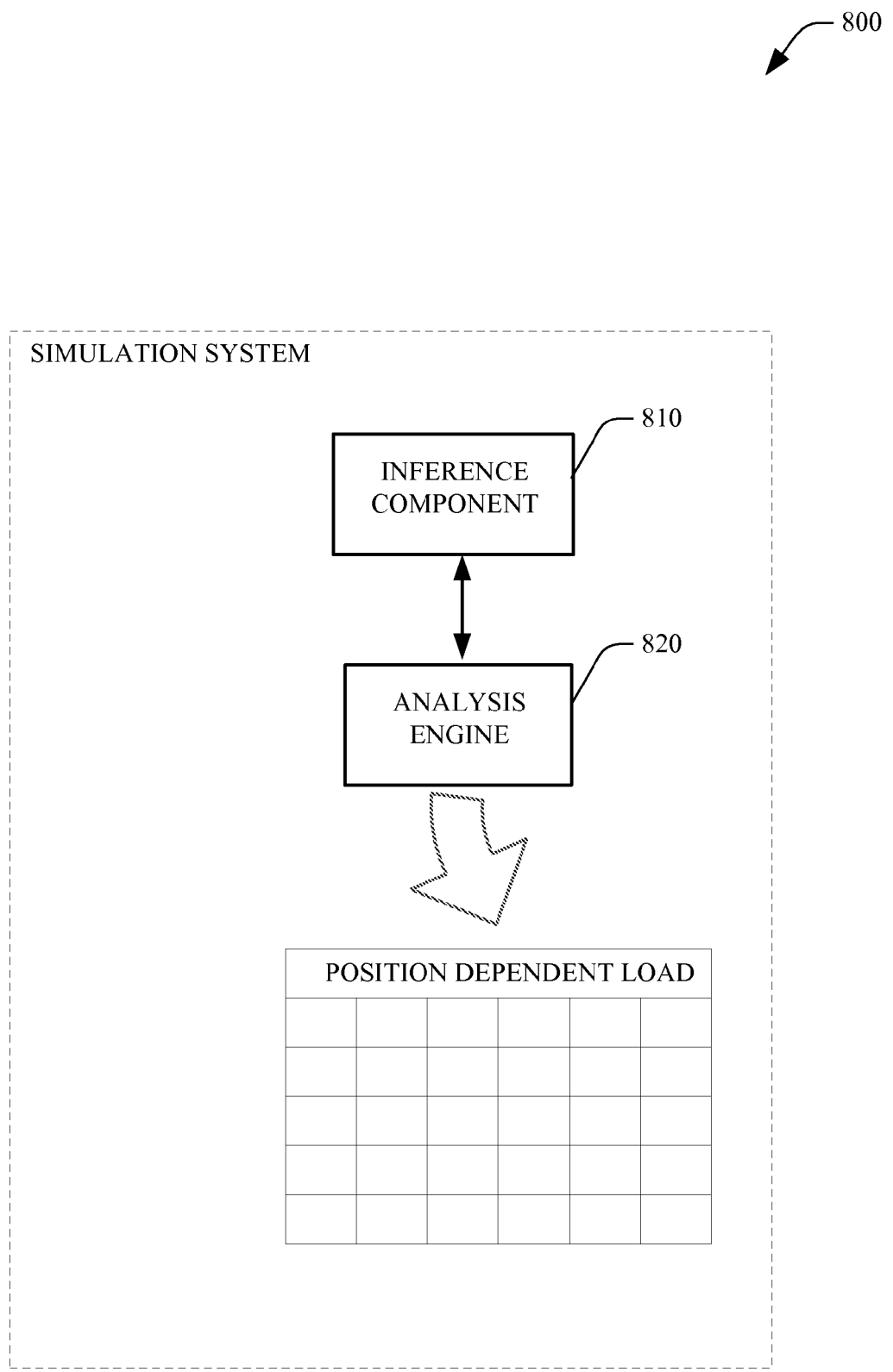
FIG. 8 illustrates an inference component that can further facilitate various aspects of the subject innovation.

In another aspect, the user can make changes to the parameters associated with the selected components and perform another analysis based on the changes in the configuration. This method results in the generation of different solutions for the design of the intended servo driven mechatronic system. After generating the different solutions the user can review the analysis of each solution and select the best solution and therefore the best components for the intended application. The simulation component 712 provides the user the ability to simulate the running of the servo driven mechatronic system based on the position dependent load 714, as described in detail above. The position dependent load (e.g., table/representation) can designate combination of loading and facilitate simulation by reducing a risk of design change; reducing design time to ship time; increasing reliability and optimize system selection/increase machine performance FIG. 8 illustrates a simulation system that further employs an inference component 810 (e.g., an artificial intelligence component) to facilitate generation of the position dependent load. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

For example, a process for determining when and how to interrogate the CAD system can be facilitated via an automatic classifier system and process. A classifier is a function that maps an input attribute vector, x=(x1, x2, x3, x4, xn), to a confidence that the input belongs to a class, that is, f(x) =confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to update or refine the previously inferred schema, tighten the criteria on the inferring algorithm based upon the kind of data being processed (e.g., rotational, linear).

It is noted that as used in this application, terms such as "component", "engine"," and the like are intended to refer to electro-mechanical systems, or a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith. Additionally, it is noted that as used in this application, terms such as "system user," "user," "operator" and the like are intended to refer to the person operating the computer-related entity referenced above.

It is also noted that the interfaces described herein can include a Graphical User Interface (GUI) to interact with the various components for providing industrial control information to users. This can include substantially any type of application that sends, retrieves, processes, and/or manipulates factory input data, receives, displays, formats, and/or communicates output data, and/or facilitates operation of the enterprise. For example, such interfaces can also be associated with an engine, editor tool or web browser although other type applications can be utilized. The GUI can include a display having one or more display objects including such aspects as configurable icons, buttons, sliders, input boxes, selection options, menus, tabs and so forth having multiple configurable dimensions, shapes, colors, text, data and sounds to facilitate operations with the interfaces. In addition, the GUI can also include a plurality of other inputs or controls for adjusting and configuring one or more aspects. This can include receiving user commands from a mouse, keyboard, speech input, web site, remote web service and/or other device such as a camera or video input to affect or modify operations of the GUI.

Additionally, it is also noted that the term industrial controller as used herein includes both PLCs and process controllers from distributed control systems and can include functionality that can be shared across multiple components, systems, and or networks. One or more industrial controllers can communicate and cooperate with various network devices across a network. This can include substantially any type of control, communications module, computer, I/O device, Human Machine Interface (HMI)) that communicate via the network which includes control, automation, and/or public networks. The industrial controller can also communicate to and control various other devices such as Input/Output modules including Analog, Digital, Programmed/Intelligent I/O modules, other programmable controllers, communications modules, and the like. The network (not shown) can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

Figure 9:
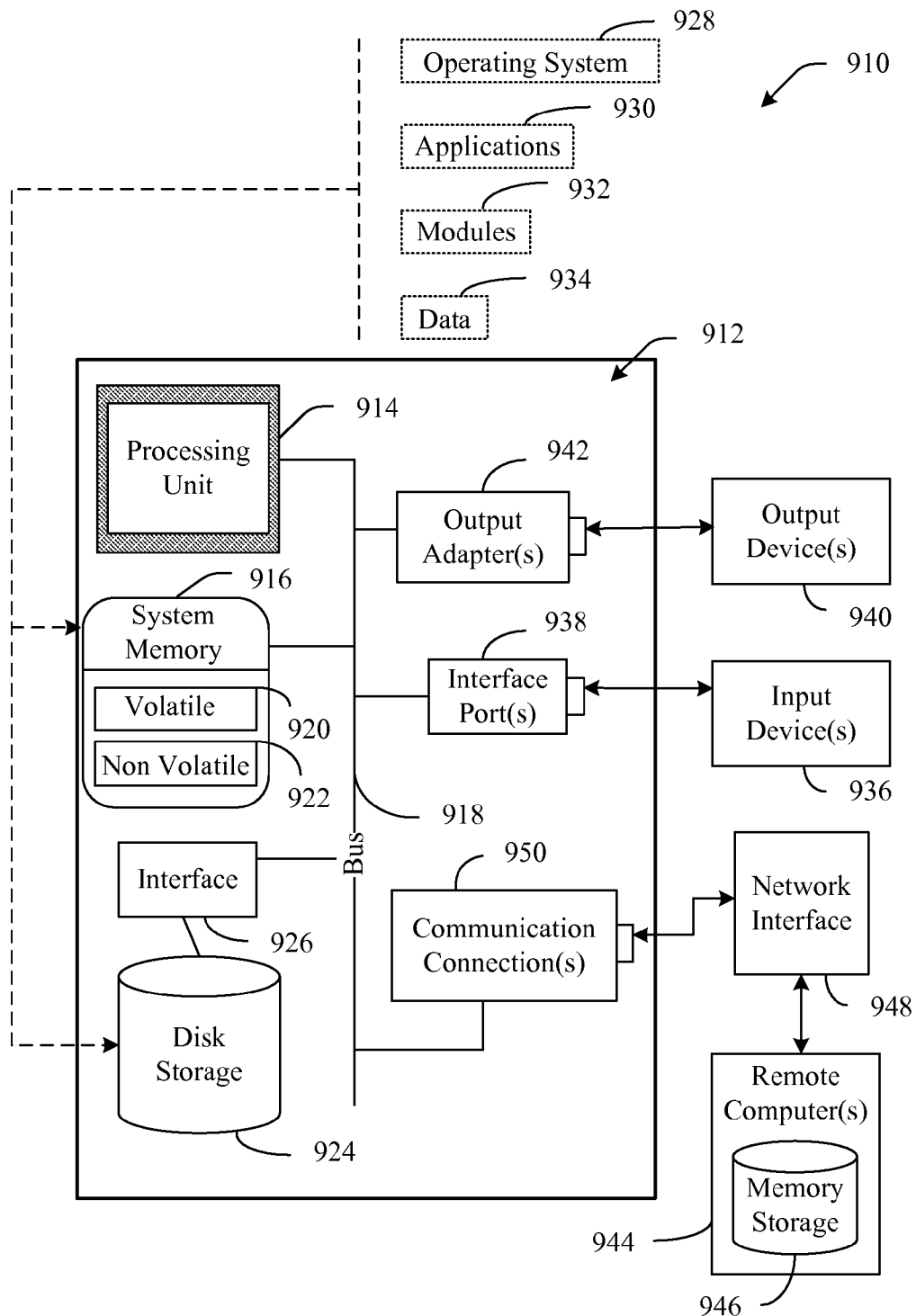
FIG. 9 illustrates an exemplary environment for implementing various aspects of the simulation system with position dependent load.

FIG. 9 illustrates an exemplary environment 910 for implementing various aspects of the simulation system with position dependent load, which can include computer 912, in accordance with an aspect of the subject innovation. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-60 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

Figure 10:
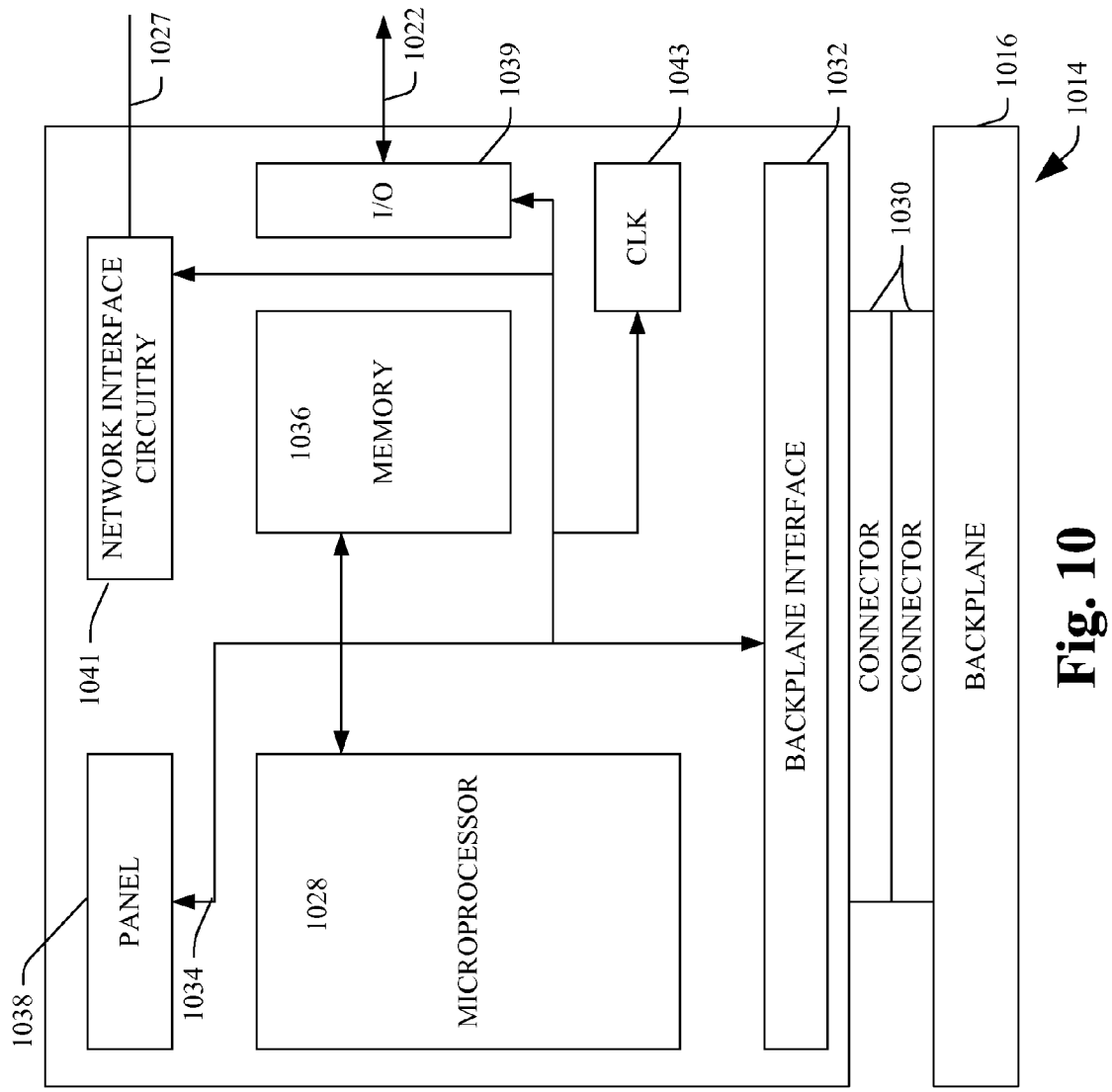
FIG. 10 further illustrates an exemplary environment that can employ simulation of servo motor system, in accordance with an aspect of the subject innovation.

FIG. 10 also illustrates an exemplary environment that can employ simulation of servo motor system, in accordance with an aspect of the subject innovation. Each functional module 1014 is attached to the backplane 1016 by means of a separable electrical connector 1030 that permits the removal of the module 1014 from the backplane 1016 so that it may be replaced or repaired without disturbing the other modules 1014. The backplane 1016 provides the module 1014 with both power and a communication channel to the other modules 1014. Local communication with the other modules 1014 through the backplane 1016 is accomplished by means of a backplane interface 1032 which electrically connects the backplane 1016 through connector 1030. The backplane interface 1032 monitors messages on the backplane 1016 to identify those messages intended for the particular module 1014, based on a message address being part of the message and indicating the message destination. Messages received by the backplane interface 1032 are conveyed to an internal bus 1034 in the module 1014.

The internal bus 1034 joins the backplane interface 1032 with a memory 1036, a microprocessor 1028, front panel circuitry 1038, I/O interface circuitry 1039 and communication network interface circuitry 1041. The microprocessor 1028 can be a general purpose microprocessor providing for the sequential execution of instructions included within the memory 1036 and the reading and writing of data to and from the memory 1036 and the other devices associated with the internal bus 1034. The microprocessor 1028 includes an internal clock circuit (not shown) providing the timing of the microprocessor 1028 but may also communicate with an external clock 1043 of improved precision. This clock 1043 may be a crystal controlled oscillator or other time standard including a radio link to an external time standard. The precision of the clock 1043 may be recorded in the memory 1036 as a quality factor. The panel circuitry 1038 includes status indication lights such as are well known in the art and manually operable switches such as for locking the module 1014 in the off state.

The memory 1036 can comprise control programs or routines executed by the microprocessor 1028 to provide control functions, as well as variables and data necessary for the execution of those programs or routines. For I/O modules, the memory 1036 may also include an I/O table holding the current state of inputs and outputs received from and transmitted to the industrial controller 1010 via the I/O modules 1020.

What has been described above includes various exemplary aspects. It is, of course, not possible to describe every conceivable combination of components or methodologies for purposes of describing these aspects, but one of ordinary skill in the art may recognize that many further combinations and permutations are possible. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the innovation. In this regard, it will also be recognized that the innovation includes a system as well as a computer-readable medium having computer-executable instructions for performing the acts and/or events of the various methods of the innovation. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An industrial automation system, comprising:
   an analysis engine configured to calculate a force associated with a mechanical member of a servo driven mechatronic system based on an analysis of a motion profile of the mechanical member;
   a representation of the force as a function of motion induced by the force in the mechanical member; and
   a simulation component configured to simulate the operation of the servo driven mechatronic system based on the representation.

2. The industrial automation system of claim 1, wherein the representation comprises data indicative of a position dependent load displayed in a tabular format comprising a plurality of at least one of rows or columns.

3. The industrial automation system of claim 1, further comprising, a parsing component configured to decompose the force into two or more subcomponents.

4. The industrial automation system of claim 1, wherein the motion profile includes data indicative of at least one of an angular velocity, linear velocity, or a dynamic parameter associated with the mechanical member.

5. The industrial automation system of claim 1, wherein the force includes at least one of a moment or a torque applied to the mechanical member due to the motion.

6. The industrial automation system of claim 1, further comprising:
   an interface component configured to receive input related to at least one of a static or a dynamic configuration of the servo driven mechatronic system; and
   a visualization component configured to present a configuration display of the at least one of the static or the dynamic configuration.

7. The industrial automation system of claim 1, further comprising, an inference component configured to employ a classifier to facilitate calculation of the force.

8. The industrial automation system of claim 1, further comprising, a data storage configured to archive at least one of the motion profile, a preconfigured process motion application solution, a preconfigured display, a report or a graph for the servo driven mechatronic system.

9. A method for simulation in an industrial automation environment, comprising:
   receiving a motion profile for a servo-motor system from a computer aided design (CAD) system;
   calculating one or more loads that are generated on one or more components of the servo-motor system based on analyzing the motion profile; and
   simulating operation of at least a portion of the servo-motor system based on the one or more loads, without communicating with the CAD system during the simulating.

10. The method of claim 9, further comprising, receiving a criterion for breaking up the one or more loads into two or more subparts.

11. The method of claim 10, further comprising, decomposing the one or more loads into the two or more sub parts based on the criterion.

12. The method of claim 11, wherein the decomposing includes parsing the one or more loads into two or more of a gravity force, an inertia force or a friction force.

13. The method of claim 9, further comprising, receiving a static representation for the servo-motor system that includes at least one of a geometry or a physical property of a portion of the servo-motor system.

14. The method of claim 9, further comprising, tabulating the one or more loads associated with the servo-motor system.

15. The method of claim 9, wherein the calculating includes determining one or more forces that are to be applied on the one or more components of the servo-motor system to induce a motion specified in the motion profile.

16. The method of claim 9, further comprising, identifying a dynamic behavior of the servo-motor system by employing empirical data.

17. A computer readable storage medium comprising computer-executable instructions that, in response to execution by an industrial automation system, cause the industrial control system to perform operations, comprising:
   calculating a load that is to be applied to a servo driven mechatronic system to induce a designated motion thereon;
   representing a one-to-one correspondence between the load and the designated motion; and
   utilizing the one-to-one correspondence to facilitate a simulation of the servo driven mechatronic system.

18. The computer readable storage medium of claim 17, the operations further comprising, displaying the simulation without communicating with a computer aided design (CAD) system.

19. The computer readable storage medium of claim 17, the operations further comprising, storing empirical data that is utilized to facilitate the calculating.

20. The computer readable storage medium of claim 17, the operations further comprising, inferring the one-to-one correspondence based on one or more classifiers.

* * * * *